Patented Mar. 12, 1946

2,396,357

UNITED STATES PATENT OFFICE 2,396,357

DIAZOAMINO COMPOUNDS AND PRINTING PASTES

Emil Gabriel Wiest, Wilmington, Del., assignor to E. I. du Pont de Nemours & Company, Wilmington, Del., a corporation of Delaware No Drawing. Application May 26, 1943,
Serial No. 488,565

9 Claims. (Cl. 260—140)

This invention relates to the stabilization of diazos, to diazo amino compounds, and to printing pastes.

The invention finds particular utility in the printing art and it will be discussed with reference to that art: A very valuable technique of dyeing has been developed wherein a primary arylamine is diazotized in the usual way and condensed with a so-called stabilizer such as methyl glucamine, and mixed with the ingredients of a printing paste including an insoluble azo dyestuff coupling component. So long as the paste is maintained on the alkaline side, the diazo remains condensed with the stabilizer, but when the paste is acidified, the diazo is regenerated and couples to the coupling component to form the dye. The stabilizers have different characteristics which vary their utility. One of the characteristics in which many stabilizers are lacking is speed of regeneration. In printing processes where thousands of yards of cloth are printed in one operation, the speed at which the process can be run is largely influenced by the speed of regeneration, and some stabilizers which are otherwise satisfactory are useless because of tardy development.

It is an object of this invention to stabilize a particular class of diazos with a stabilizer which is satisfactory in other respects and fast in regeneration.

The objects of the invention are attained, generally speaking, by condensing the diazo of a negative arylamine with a stabilizer called 6-sulfo-tetra-hydro-quinoline-8-carboxylic - acid. This stabilizer has the formula:

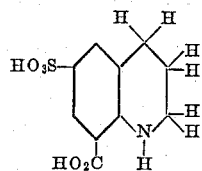

The diazo component used in this invention is the diazo of any primary arylamine which is free from water solubilizing groups such as sulfonic and carboxylic acid and which contain an adequate number of negative groups. The negative groups are nitro, chloro, bromo, sulfonamide, carboxamide, and N-alkyl- and N-dialkyl-sulfonamide and carboxamide. Nitro groups are frequently considered to be the most negative of all groups, one of them being usually enough to produce sufficient negativity in the compound. Chlorine is also quite negative, although it is frequently desirable to use two chlorine substituents to produce satisfactory negativity. In some instances a single one of the other negative groups is adequate, but in other cases more than one is required.

The coupling components may be from any diazo coupling components although for the general purposes of this invention components of high molecular weight are preferred. When the compound is to be used in a printing paste, the coupling component should also be free from water solubilizing groups such as sulfonic and carboxylic. Temporary solubilizing groups which lose their effect on suitable mild treatment may be initially present in the coupling components, the requirement of solubility being that the compound must be finally insoluble if it is to be used in printing. Typical satisfactory coupling components are the arylides of beta-oxy-naphthoic acid, the arylides of aceto-acetic acid, substituted carbazoles, and other high molecular weight heterocyclic coupling components.

The general procedure is to add a solution of an arylamine diazo to the concentrated alkaline aqueous solution of this stabilizer, maintaining alkalinity and a low temperature until the stabilizer has condensed with a molar equivalent quantity of diazo. The diazoamino thus secured is very soluble, is stable in alkaline printing pastes, and has most unusual properties of rapid regeneration.

The proportions of the diazo and the coupling component are not rigidly fixed, an excess of one or the other being acceptable. Usually, however, they are employed in approximately equimolar quantities or with a two to fifteen percent molar excess of the coupling component.

The alkaline agent in the paste is usually sodium hydroxide, although any strong organic or inorganic base is usable, providing, of course, that it does not form insoluble salts with any of the paste components.

The solvent in the paste may be only water, or in addition it may contain some water-soluble organic solvent which increases the speed of dissolving or increases the solubility of the paste components. Such common agents are Cellosolve, alcohol, ethylene glycol and ethylene-glycol-monobutylether, dimethoxy-ethanol or hydroxy-aliphatic amines. If a sufficiently basic hydroxy-aliphatic amine is used, preferably a secondary or tertiary amine, it may serve both as the alkaline and as the solubilizing agent. The amount of water in the paste may be varied to obtain compositions of the desired printing consistency.

The thickening agent may be any one of the water-soluble or water-dispersible type; among the ones usually preferred are starch-tragacanth gum and the soluble methyl and ethyl ethers of cellulose.

Modifications are possible in the preparation of these diazoamino compounds. There is no essential order of addition of reacting materials. The temperature may be in any range below 20° C., although those below 10° C. are preferred. The alkalinity may be supplied by various acid-binding agents, such as pyridine; or the carbonate, bicarbonate or hydroxide of the alkaline earth or alkali metals or ammonium; the preferred agents are ammonium, sodium, and potassium carbonates.

The isolation of the diazoamino from solution may be accomplished in various ways. Precipitation as an insoluble salt is very convenient, and the precipitating agent may be di-ortho-tolyl-guanidine or any soluble material, organic or inorganic, which forms an insoluble precipitate with the diazoamino employed; benzyl-thiuronium chloride is such an agent. Soluble impurities are filtered off; the soluble diazoamino is regenerated from the precipitate by the addition of caustic. It is not necessary that the free diazoamino be regenerated before forming the printing composition, as this may be done in the paste merely by adding extra caustic.

The length of time for which the printed cloth is exposed to the acid-treatment in the acid-steam chamber is proportional to the length of time required for the regeneration of the diazo. The more quickly the diazo is regenerated the more rapidly the cloth may be passed through the acid-steam chamber. Quick regeneration means not only a decrease in deterioration of cloth due to exposure to acids at high temperatures, but also a decrease in operating time and expense per unit area of cloth.

Diazoaminos formed from 6-sulfo-tetra-hydro-quinoline-8-carboxylic-acid as described in this invention regenerate the diazo very rapidly under the usual acid-aging conditions. This is demonstrated by the following test:

A drop of the alkaline solution of the condensation product of the diazoamino of 2,5-dichlor-aniline and 6-sulfo-tetra-hydro-quinoline-8-carboxylic acid, is placed upon a piece of filter paper, and to it is added a drop of the alkaline solution of a coupling component, such as of 2-phenyl-amino-5-hydroxy-naphthalene-7-sulfonic acid. No color is observed as long as the mixture is left alkaline, indicating the stability of the diazo condensation product under these conditions. However, when a drop of a dilute solution of a weak organic acid, such as 2% acetic acid, is added to the mixture, a bright red color is formed within ten seconds by the coupling of the liberated diazo with the coupling component. The same test applied to the condensation product of 2,5-dichlor-aniline diazo with such known stabilizing agents as sarcosine, N-methyl-taurine, aniline-2,5-disulfonic acid, proline, and the mono- and di-sulfo-tetra-hydro-quinolines yields a pinkish-red color of much weaker shade and only after one or two minutes time and often at elevated temperature. The same difference in rate of color development is noted when printing pastes containing 4-chlor-2-amino-toluene diazo condensed with the two types of stabilizers are printed side by side and acid-aged simultaneously for varying periods of time; the print from the diazoamino of this invention displays a strong color at thirty seconds to one minute, whereas the diazoamino from the quinoline stabilizers of the prior art requires at least two minutes to develop a comparable shade.

A further advantage is attained by this invention. It has been found that arylamines bearing negative groups form diazos whose condensation products with stabilizers such as sarcosine, N-methyl-taurine, aniline-2,5-disulfonic acid, and the tetra-hydro-quinoline-sulfonic acids not substituted by carboxy groups, are comparatively stable; the diazo is regenerated only very incompletely under the customary acid-aging conditions employed in the printing trade, and developed colors are quite weak and dull. However, when these same diazos are condensed with the stabilizer of the present invention, the diazoamino formed is easily broken down in the acid-ager, and the developed color is bright and full.

The following examples illustrate the invention but do not limit it:

*Example 1*

An aqueous solution containing 21.6 parts of the diazonium chloride of 4-nitro-2-amino-anisole in 85 parts of solution is prepared by reacting 16.8 parts of 4-nitro-2-amino-anisole with 6.9 parts of sodium nitrite and 20.8 parts of 20° Bé. hydrochloric acid in 40 parts of water cooled by external icing to 5–10° C. The diazo solution is filtered, and added slowly with stirring to a solution of 25.7 parts of 6-sulfo-tetra-hydro-quinoline-8-carboxylic acid in 20 parts of water, simultaneously adding solid potassium carbonate so as to maintain the solution at all times red to Brilliant yellow paper. The addition takes about one hour, at the end of which no test for free diazo is obtained; the solution is filtered and a 30% solution of caustic is added till the filtrate becomes red to Clayton yellow paper. The solution is concentrated under vacuum at less than 50° C. to the point where considerable solid appears. The solution is cooled and the solid product is filtered off, and dried in a vacuum desiccator to an orange powder. It is very soluble in water.

*Example 2*

A solution containing 21 parts of the diazonium chloride of 2,5-dichlor-aniline in 173 parts of solution is prepared by reacting 16.2 parts of 2,5-dichlor-aniline according to the usual diazotization procedure with 6.9 parts of sodium nitrate and 50 parts of 20° Bé. hydrochloric acid in 75 parts of water cooled to 0–5° C. by external icing. The diazo solution is clarified by stirring with 3 parts animal charcoal and 3 parts of Filter-Cel and then filtering.

The filtered solution is added slowly to a stirred solution of 25.7 parts of 6-sulfo-tetra-hydro-quinoline-8-carboxylic acid in 50 parts of alkaline aqueous solution, while simultaneously there is added sufficient finely divided sodium carbonate to maintain the reaction solution in a strongly alkaline condition.

The addition is complete and no positive test for diazo is obtained at the end of one hour. The reaction solution is filtered, and sufficient 30% caustic solution is added to the filtrate to render it strongly alkaline to Clayton yellow paper. It is then concentrated by evaporation at less than 40° C. till solid material appears in some quantity; the mixture is externally iced to 5° C. for two hours and then filtered. The solid product thus obtained is dried in a vacuum desiccator over calcium chloride for 48 hours. It is an orange powder, very soluble in water.

*Example 3*

A solution containing 18.6 parts of the diazonium chloride of 4-nitro-aniline in 92 parts of solution is prepared according to customary diazotization procedures by reacting 13.8 parts of 4-nitro-aniline with 6.9 parts of sodium nitrite and 20.8 parts of 20° Bé. concentrated hydrochloric acid in 50 parts of water at 0–5° C. The diazo solution is stirred for one-half hour and then filtered.

The filtered solution is slowly added to a stirred solution of 25.7 parts 6-sulfo-tetra-hydro-quinoline-8-carboxylic acid and 35 grams of potassium carbonate in 100 parts of water at 0–5° C. The addition requires about three-quarters of an hour, at the end of which time no free diazo is present; more carbonate is added if necessary to maintain the solution strongly alkaline to Brilliant yellow paper. The solution is made alkaline to Clayton yellow paper with 30% sodium hydroxide, warmed to 45° C. and filtered. The filtrate is evaporated at less than 40° C. under a blast of air till a considerable quantity of solid appears. The mixture is cooled to 5° C. in an ice-bath, and the solid product is removed by filtration, and dried in a vacuum desiccator. The orange-brown powder which results is very soluble in water.

*Example 4*

An aqueous solution of 18.9 parts of the diazonium chloride of 4-chloro-2-amino-toluene is prepared by reacting 14.2 parts of 4-chloro-2-amino-toluene with 6.9 parts of sodium nitrite and 20.8 parts of 20° Bé. hydrochloric acid in 60 parts of water at 0–5° C. After the reaction has been completed, the solution is filtered.

The filtrate is added dropwise over a period of an hour to a stirred solution of 25.7 parts of 6-sulfo-tetra-hydro-quinoline-8-carboxylic acid and 67 parts of potassium carbonate in 50 parts of water maintained by external icing at 2–10° C. At the end of this time, there is obtained no test for free diazo. The condensation liquor is filtered and iced externally to 2–7° C. Three hundred parts of a 10% solution of di-ortho-tolyl-guanidine hydrochloride are added slowly with rapid agitation. The diazoamino salt of di-ortho-tolyl-guanidine thus precipitated is filtered and washed twice with 200 parts of cold water, stirring the mass vigorously on each wash. The press cake obtained from filtration is then churned on a "milk-shake" type stirrer, and 51 parts of 2-N caustic solution is added dropwise. The mixture is filtered and the press cake is washed by churning with 25 cc. of water. The purified diazoamino compound is then present in the clear dark red filtrate in a concentration varying from 8–15%. It may be used directly in the printing paste compositions after analyses for diazoamino and for caustic concentration.

The formulas of the diazoamino products produced in Examples 1 to 4 are probably as follows:

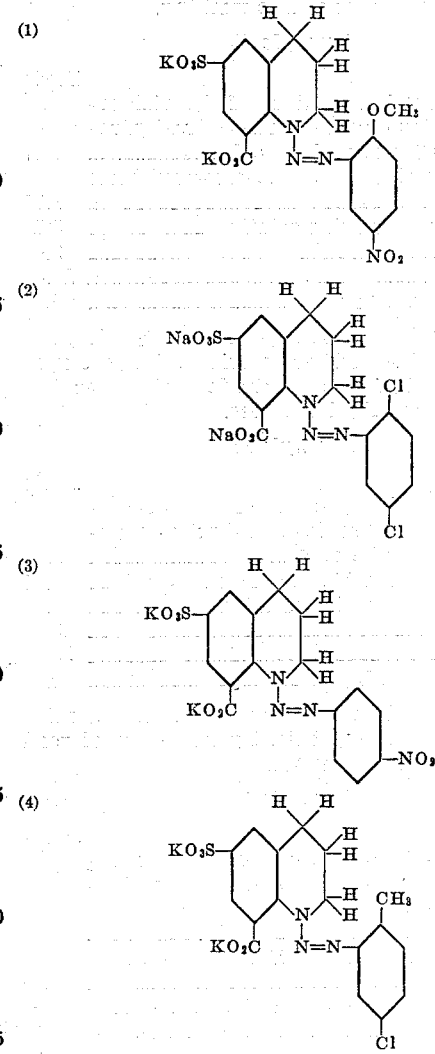

Other examples are as follows, using procedure similar to the foregoing:

| Examples | Diazo component base | Stabilizer | Coupling component base | Color |
| --- | --- | --- | --- | --- |
| 5 | p-Nitro-toluidine | 6-sulfo-tetra-hydro-quinoline-8-carboxylic acid. | B-naphthyl-amide of aceto-acetic acid. | Yellow. |
| 6 | 4-chloro-2-nitro-aniline | do | m-Nitro-anilide of B-oxy-naphthoic acid. | Red. |
| 7 | 4-methyl-2-nitro-aniline | do | do | Deep red. |
| 8 | 4,5-dichloro-2-amino-1-methyl-benzene. | do | do | Red. |
| 9 | 3-chloro-aniline | do | 5-chloro-2-toluidide of B-oxy-naphthoic acid. | Scarlet orange. |
| 10 | 3-amino-carbazole | do | p-Chlor-anilide of 2-hydroxy-carbazole-3-carboxylic acid. | Brown. |

Examples of printing compositions, for purposes of illustration only, are as follows:

*Example 11*

Parts

The condensation product of 4-nitro-2-amino-anisole diazo and 6-sulfo-tetra-hydro-quinoline-8-carboxylic acid _____ 1.63
The m-nitro-anilide of B-oxy-naphthoic acid _____ 1.07
35% sodium hydroxide solution _____ 3.0
Water _____ 25.3
Starch-tragacanth gum _____ 70.0

When a cotton cloth is printed with this paste and then exposed to steam and acetic acid vapors, a bright deep red color is obtained; it has excellent fastness to light and to washing.

*Example 12*

| | Parts |
|---|---|
| The condensation product of 2,5-dichloraniline diazo and 6-sulfo-tetra-hydro-quinoline-8-carboxylic acid | 2.27 |
| The o-phenetidide of B-oxy-naphthoic acid | 1.33 |
| 35% sodium hydroxide solution | 3.0 |
| Cellosolve | 3.0 |
| Water | 20.4 |
| Starch-tragacanth gum | 70.0 |

When a cotton cloth is printed with this paste and then "acid-aged" as described, the developed color is a bright orange shade which also has good wash- and light-fastness.

*Example 13*

| | Parts |
|---|---|
| The condensation product of p-nitro-aniline diazo and 6-sulfo-tetra-hydro-quinoline-8-carboxylic acid | 1.89 |
| The a-naphthylamide of acetoacetic acid | 0.91 |
| 35% sodium hydroxide solution | 3.0 |
| Cellosolve | 5.0 |
| Water | 19.2 |
| Starch-tragacanth gum | 70.0 |

Cloth printed with this composition and acid-aged develops a bright light yellow color of good general fastness properties.

*Example 14*

| | Parts |
|---|---|
| A 10% solution of the condensation product of 4-chloro-2-amino-toluene and 6-sulfo-tetra-hydro-quinoline-8- carboxylic acid | 16.0 |
| The o-phenetidide of B-oxy - naphthoic acid | 1.15 |
| 35% sodium hydroxide solution | 3.0 |
| Water | 9.85 |
| Starch tragacanth gum | 70.0 |

The color developed from prints of this paste is a vivid scarlet with excellent fastness to light and washing.

As many different embodiments of this invention may be made without departing from the spirit and scope thereof, it is understood that I do not limit myself to the specific embodiments thereof except as defined in the appended claims.

I claim:

1. A compound represented by the formula

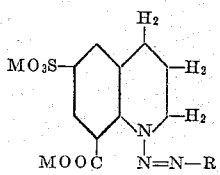

in which M is a solubilizing cation and R is a radical devoid of water solubilizing groups from the group consisting of the nuclear radicals of 3-amino carbazole and negative primary arylamines of the benzene series.

2. A compound represented by the formula

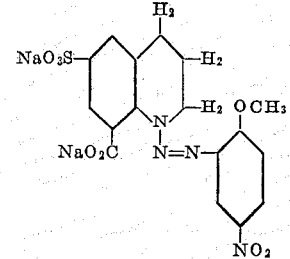

3. The compound represented by the formula

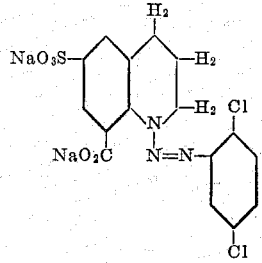

4. The compound represented by the formula

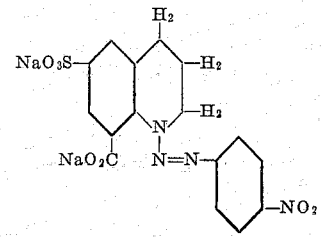

5. A printing paste comprising an azo dyestuff coupling component and a diazoamino compound having a negative aryl diazo radical which is devoid of water-solubilizing groups condensed with the radical of 6-sulfo-tetrahydroquinoline-8-carboxylic acid, said diazo radical being from the group consisting of the nuclear radicals of 3-amino carbazole and negative primary arylamines of the benzene series.

6. A printing paste in accordance with claim 5 in which the coupling component is devoid of water-solubilizing groups.

7. A printing paste comprising a coupling component which produces an insoluble azo dyestuff when coupled with the diazo of an arylamine which is devoid of water-solubilizing groups, and a diazo amino compound having the formula of claim 2.

8. A printing paste comprising a coupling component which produces an insoluble azo dyestuff when coupled with the diazo of an arylamine which is devoid of water-solubilizing groups, and a diazo amino compound having the formula of claim 3.

9. A printing paste comprising a coupling component which produces an insoluble azo dyestuff when coupled with the diazo of an arylamine which is devoid of water-solubilizing groups, and a diazo amino compound having the formula of claim 4.

EMIL G. WIEST.